United States Patent
Townes et al.

(10) Patent No.: US 7,037,075 B2
(45) Date of Patent: May 2, 2006

(54) BLADE COOLING

(75) Inventors: Roderick M Townes, Derby (GB); Ian Tibbott, Lichfield (GB)

(73) Assignee: Rolls-Royce plc, London (GB)

( * ) Notice: Subject to any disclaimer, the term of this patent is extended or adjusted under 35 U.S.C. 154(b) by 52 days.

(21) Appl. No.: 10/724,100

(22) Filed: Dec. 1, 2003

(65) Prior Publication Data
US 2004/0109754 A1  Jun. 10, 2004

(30) Foreign Application Priority Data
Dec. 6, 2002  (GB) .................... 0228443

(51) Int. Cl.
*F01D 5/18* (2006.01)
(52) U.S. Cl. .............. 416/97 R; 416/191; 416/192
(58) Field of Classification Search ........ 415/115–116, 415/173.1, 173.5, 173.6; 416/92, 96 R, 96 A, 416/97 R, 189, 191, 192
See application file for complete search history.

(56) References Cited

U.S. PATENT DOCUMENTS

| 4,390,320 A * | 6/1983 | Eiswerth ............... 416/97 R |
|---|---|---|
| 5,503,529 A | 4/1996 | Anselmi et al. |
| 5,531,568 A * | 7/1996 | Broadhead ............... 416/97 R |
| 5,695,321 A | 12/1997 | Kercher |
| 5,733,102 A | 3/1998 | Lee et al. |
| 6,672,829 B1 * | 1/2004 | Cherry et al. ............... 415/115 |
| 6,790,005 B1 * | 9/2004 | Lee et al. ............... 416/97 R |

FOREIGN PATENT DOCUMENTS

JP          58-47104 A  *  3/1983  ............... 416/189

* cited by examiner

*Primary Examiner*—Christopher Verdier
(74) *Attorney, Agent, or Firm*—W. Warren Taltavull; Manelli Denison & Selter PLLC

(57) ABSTRACT

Turbine blades used in jet engines generally require cooling in order to achieve desired engine performance. Cooling of blade tip areas is difficult due to the limited space available such that thickening tip areas in order to allow passages and holes to be incorporated adds to weight and therefore stressing along with causing additional manufacturing costs. The present cooling arrangement includes coolant release passages 5 which present coolant flow to coolant entrainment elements or fins 2 such that the coolant flow is entrained close to the blade tip surface 12. Thus, turbulent air flow caused by adjacent shrouds and edges are inhibited from diluting the coolant flow and therefore reducing thermal efficiency.

9 Claims, 3 Drawing Sheets

BLADE COOLING

FIELD OF THE INVENTION

The present invention relates to blade cooling and more particularly to blade cooling in high temperature turbine blades used in jet engines.

Cooling of turbine blades in jet engines is highly important in order to maintain structural integrity and allow the engine to operate at higher temperatures and therefore efficiency than would be normally acceptable with the materials from which the blade is made. Cooling is generally required throughout the turbine blade and of particular interest with regard to the present invention are the tip shrouds from each blade. Such tip shrouds are located as indicated in the attached drawing marked "Prior Art" in the area marked by circle 100. These turbine blades are at relatively high temperature and it will be appreciated that unless the temperature is limited there will be oxidation and therefore degradation resulting in a shorter operational life for these blades.

Previously, two techniques have been utilised in order to provide tip shroud cooling. Firstly, large numbers of internal cooling passages are positioned within areas of the tip shrouds where high temperature elevation occurs. Cool air is passed through these passages from a cooling gallery system within the blade. Cooling is efficient but has the significant disadvantage of requiring the shroud surface to be thickened in order to accommodate the holes which in turn increases weight and hence stress levels within the turbine blade or aerofoil walls upon which the tip shroud is located. It should also be understood that drilling of these cooling passages or holes in the tip shroud is a significant additional manufacturing cost. A second prior technique for cooling of turbine blade tip shrouds is by passing cooling air over the top of the shroud surface on which turbulators are positioned to increase heat transfer efficiency. Although not as efficient as the first prior technique, the second approach has the significant advantages of reducing manufacturing costs and weight induced stress within the blade. The main disadvantage of the second prior technique is that cooling efficiency is markedly reduced in comparison with the first prior cooling technique due to shroud tip leakage creating highly turbulent (swirling) air flow such that cooling air is rapidly dispersed and diluted prior to reaching the tip blade extremities. In such circumstances, these extremities may overheat and oxidise reducing blade life.

SUMMARY OF THE INVENTION

In accordance with the present invention, there is provided a blade cooling arrangement comprising a blade tip including a coolant gallery in use upstream of flow entrainment means, the gallery including release passages to release coolant in use close to the blade tip surface whilst the flow entrainment means entrains that released coolant to facilitate flow isolation from turbulent air created by a leading shroud edge of the blade tip.

Preferably, the gallery has a core hole from a coolant supply and a cavity from which extend the release passages.

Normally, the release passages extend laterally with an open end adjacent the flow entrainment means. Generally, the spacing between the open ends of each release passage and the entrainment means is determined by desired flow rate and entrainment. Typically, the release passages may have a slight downward inclination towards the flow entrainment means.

Preferably, the flow entrainment means comprises upstanding fins to form channels for entrainment of the coolant flow. Normally, the fins are above the height of the release passages. Typically, the fins are perpendicular to the blade tip surface. Generally, each fin will have substantially the same height as other fins. Alternatively, fins may have different heights, different shapes or presentation angle relative to the release passages for specific coolant entrainment as required for a particular part of the blade tip dependent upon desired cooling efficiency and/or blade structural integrity retention. Normally, the fins provide additional contact surface area for enhanced heat transfer from the blade tip to the coolant flow.

Possibly, the blade tip may include trip strips and/or other heat transfer augmentation features to improve heat transfer to the coolant air flow.

Also in accordance with the present invention there is provided an engine incorporating turbine blades including the present blade cooling arrangement described above.

BRIEF DESCRIPTION OF THE INVENTION

An embodiment of the present invention will now be described by way of example only with reference to the accompanying drawings in which.

DETAILED DESCRIPTION OF THE INVENTION

Figure 1:
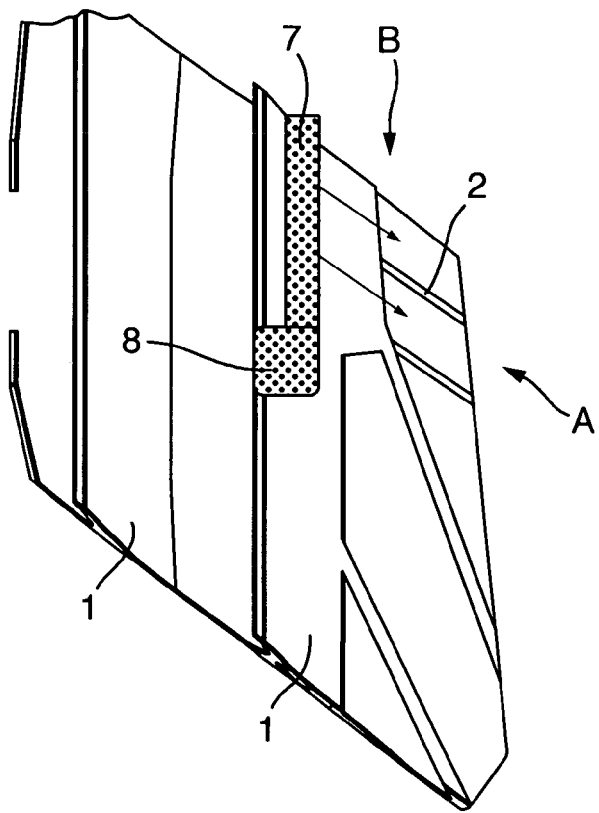
FIG. 1 is a plan view of a blade tip surface.
Figure 2:
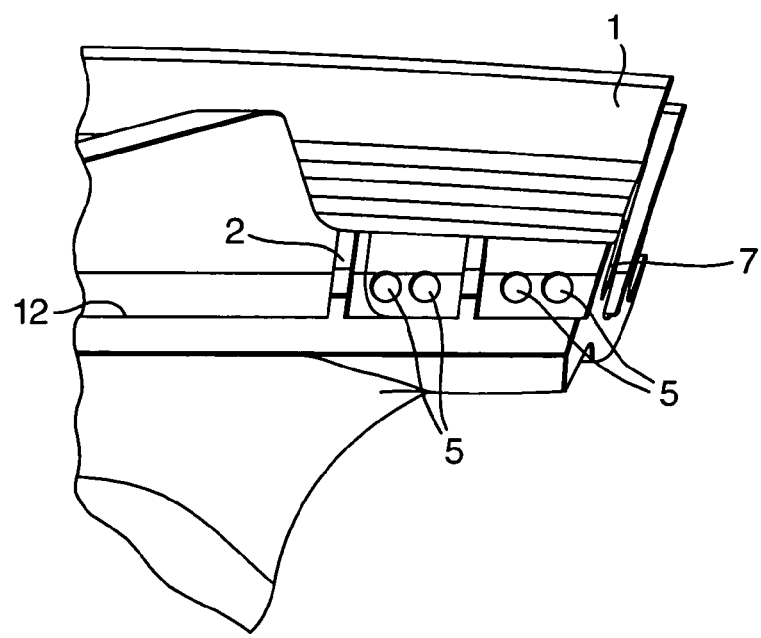
FIG. 2 is a side view in the direction of arrow A depicted in FIG. 1 of a blade tip.
Figure 5:
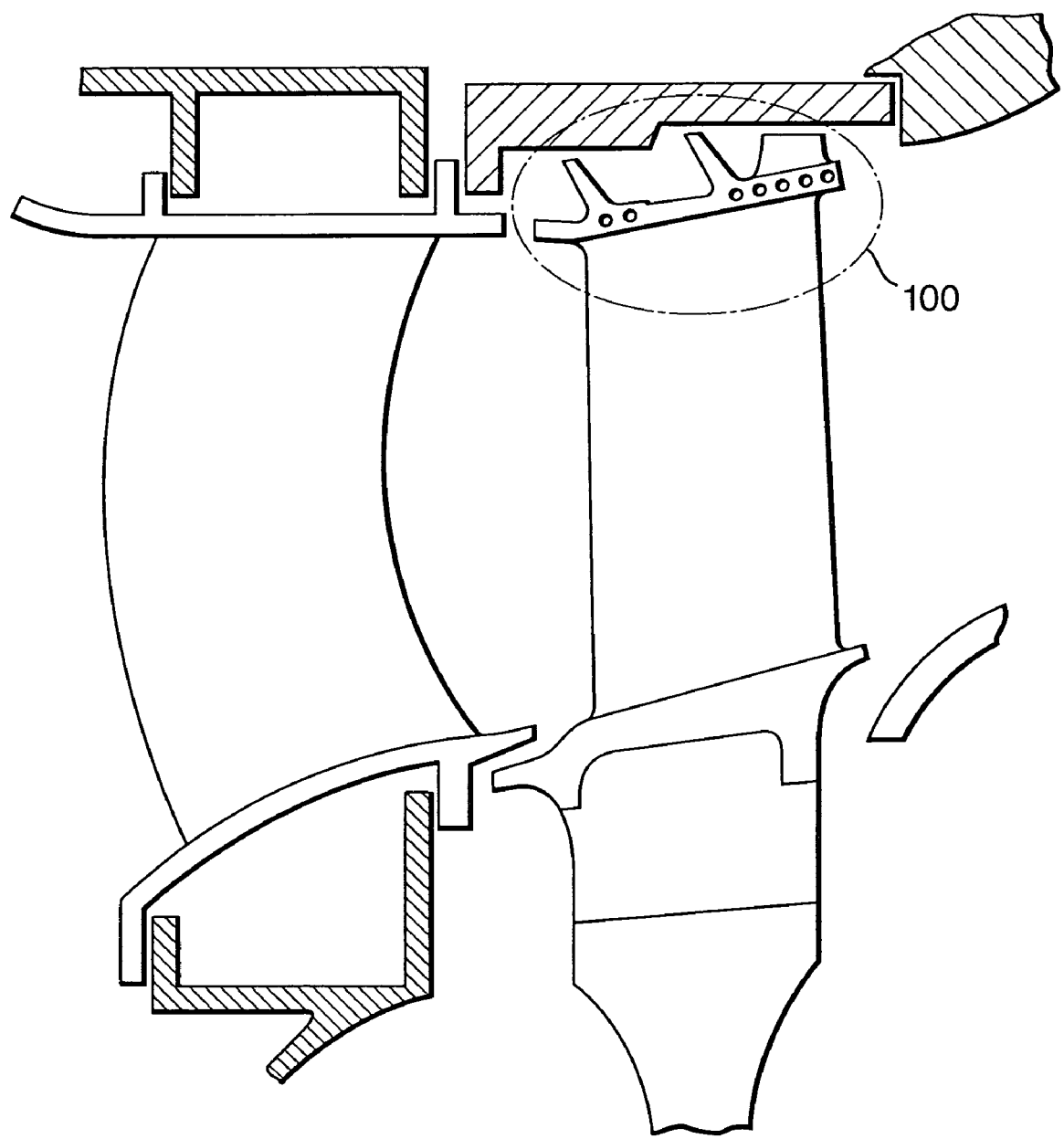
FIG. 5 is a side view of a prior art structure.

Referring to FIGS. 1 and 2, there is shown a blade tip incorporating a cooling arrangement in accordance with the present invention. The blade tip includes blade shrouds 1 which extend laterally across the blade tip surface. In use, these blade shrouds interengage with a casing of an engine (see FIG. 5) in order to provide a labyrinth type edge seal. In accordance with the present invention, a coolant gallery 7 is provided within the structure of the blade such that a coolant supply from a base coolant system provides coolant in the form of air through a core passage 8 to the gallery 7. The gallery 7 releases coolant air over the surface of the blade tip in order to provide cooling. As can be seen, the gallery 7 is positioned downstream of the shroud 1 but upstream of flow entrainment elements 2. Thus, coolant air released from the gallery 7 is entrained by the elements 2 into close proximity with the surface of the blade tip for improved heat transfer to the coolant flow and therefore cooling of the blade tip. FIG. 2 illustrates that the gallery 7 releases the coolant through holes 5 adjacent the entrainment elements 2. As can be seen, typically two release holes or passages 5 are provided for each entrainment channel created by entrainment elements 2. These entrainment elements 2 are generally upstanding fins substantially perpendicular to the blade tip surface 12 and normally extend above the height of the release passages 5 to ensure adequate entrainment of the coolant flow released through those passages 5.

It will be understood in use, that the blade tip will rotate relatively quickly with the turbine blade of which it is a part.

Thus, in order to accommodate that rotational flow the entrainment elements or fins 2 are generally angled as depicted in FIGS. 1 and 2.

As described previously, with regard to surface cooling of blade tips the leading edge or blade shrouds 1 create turbulent air flow as the blade rotates and that turbulent air flow generally disperses coolant if allowed to interact with the released coolant flow.

In accordance with the present invention by use of a gallery 7 and release passages 5 associated with entrainment elements there is entrainment of the released coolant into a stratified flow. This entrainment is created by the entrainment fins 2 such that the turbulent air flow created by the shrouds 5 is substantially prevented from dispersing the coolant flow adjacent to the blade tip surface 12. In such circumstances, the coolant flow can through heat transfer more effectively and efficiently cool the blade tip. By increasing the effectiveness of cooling, the blade tip may be cooled with reduced coolant flow so increasing engine performance or enabling the blade tip design to survive in temperatures which would normally be considered extreme and require internal cooling in accordance with the first prior art cooling approach described above with its associated costs, weight and stress penalties. It should also be understood that the entrainment fins 2 provide greater surface area contact with the coolant flow for heat exchange and therefore cooling efficiency.

Figure 3:
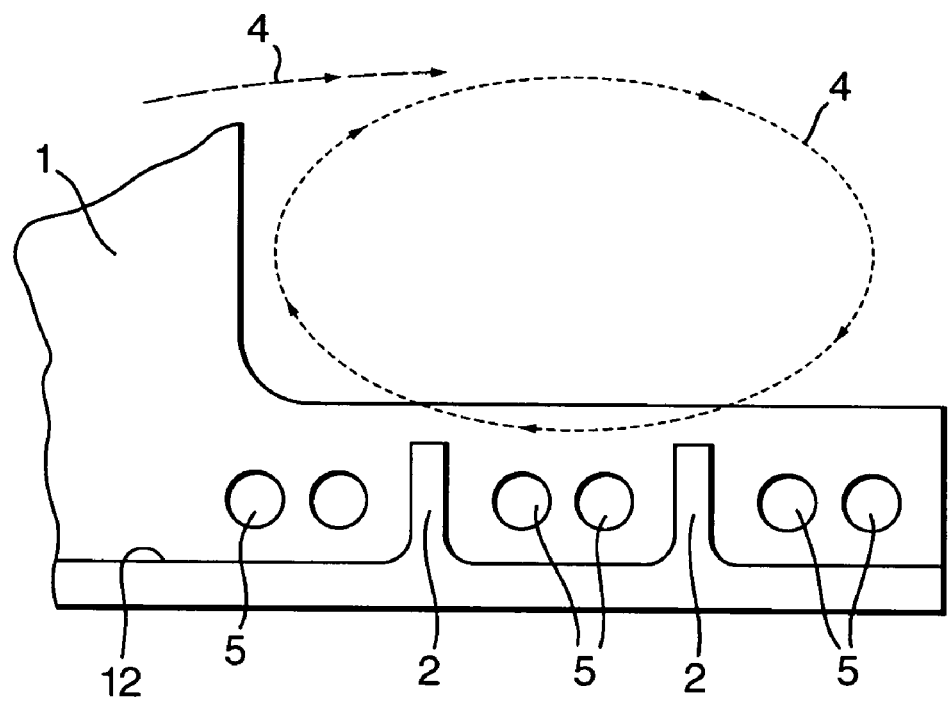
FIG. 3 is a schematic view in the direction of arrow A depicted in FIG. 1 illustrating air flows.
Figure 4:
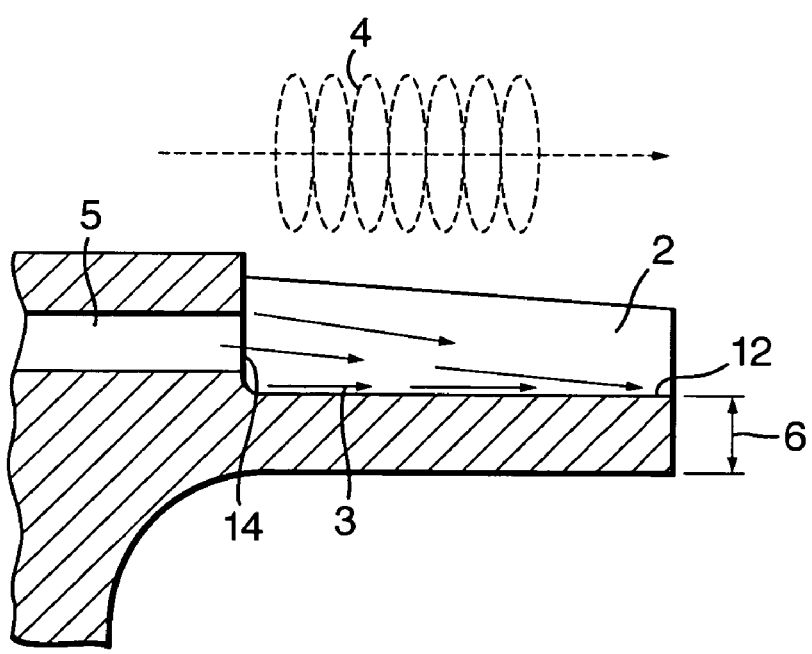
FIG. 4 is a schematic view in the direction of arrow B depicted in FIG. 1 of the blade 2 illustrating air flows.

FIGS. 3 and 4 schematically illustrate coolant air flows within a blade tip in accordance with the present invention. Thus, coolant air is released through holes 5 into the entrainment channels created by the entrainment elements or fins 2. This released coolant flow is retained in close proximity to a blade tip surface 12 in order to provide cooling of the blade tip. As described previously, air flow over the tip shroud 1, and leading edges of the blade tip, in the direction of broken arrows 4 is turbulent. However, due to the entrainment elements or fins 2, this turbulent air flow (broken arrows 4) cannot readily impinge or mix with the entrained and released coolant flow through the holes 5 within the channels created between the fins 2. Thus, the coolant flow is not dispersed or diluted and so remains effective for a longer period of time in order to cool the blade tip. It is rotation of the blade and therefore the blade tip along with the jetting effect of a positive pressure differential which provides the desired entrainment within the channels created by the entrainment elements or fins 2. In short, the entrainment created by these elements 2 acts by an impeller action to force coolant air flow within the entrainment channels created by the elements 2 and this driven flow acts to inhibit penetration by the turbulent air flows (broken arrows 4) created by the shrouds 1 and so retains coolant air flow close to the blade surface for cooling purposes rather than allow that coolant air flow to be dispersed and mingled with the warmer turbulent air flows over the shrouds 1 and edges (broken arrows 4).

As illustrated in FIG. 4, the release holes or passages 5 generally extend away from a coolant gallery in order to release coolant flow (arrow head 3) towards the entrainment element 2. Clearly, within the gallery and through the passages 5 there is generally a positive pressure driving the coolant flow out of an opening 14 of the passage 5. Once the coolant flow has exited the opening 14 that pressure differential is released and the coolant can disperse. However, there is a general jet projection towards the entrainment fins 2 as a result of the positive pressure propelling coolant flow and then rotation of the fins 2 with the turbine blade as an impeller will act to "scoop" that coolant flow in order to entrain and drive the coolant flow along the channels created between the entrainment elements or fins 2. That forced air flow generally creates a layer strata such that penetration by the turbulent air flow 4 is inhibited and so dispersal of the coolant flow away from the surface 12 is inhibited such that the cooling function is more efficiently performed. Generally, as depicted in FIG. 4, it is possible for the coolant flow 3 to be slightly downwardly inclined towards the entrainment created by the fins or elements 2 to ensure good entrainment. However, care should be taken that the angle of inclination is slight such that there is limited "bounce off" of coolant air flow upon the surface 12 contrary to good entrainment and causing dispersal by the turbulent air flows (broken arrow heads 4).

Good entrainment of the coolant flow through the passage 5 and out of opening 14 is a requirement of the present invention. Thus, normally as depicted in the Figs. the entrainment elements or fins 2 will extend to a height above that of the passages or opening 14.

Normally, as depicted in FIGS. 2 and 3 the entrainment elements or fins 2 will be substantially perpendicular to the blade tip surface 12. However, these elements or fins 2 could be shaped for improved coolant flow entrainment. For example, the elements or fins 2 could include overhang features to facilitate scoop capture and therefore entrainment of the coolant flow presented through the passages 5 and opening 14.

As indicated previously, normally the entrainment elements or fins 2 will be arranged in an angular configuration as more clearly depicted in FIG. 1 which is consistent with the rotational direction of the blade on which the blade tip is located. Such angling will improve coolant flow entrainment and therefore flow strata resistance to penetration and impingement by the turbulent air flow 4.

The embodiment depicted with respect to the FIGS. is of a rearward concave (suction side) part of a blade tip. However, the present invention could also be incorporated in any position on the shroud where temperature conditions and geometry allows. It is the creation of a positive coolant air flow entrainment within the channels created by the entrainment elements or fins 2 which ensures resistance to impingement by the turbulent air flows and so greater cooling efficiency by that coolant air flow over the blade tip surface.

The entrainment elements or fins 2 are machined into the blade tip surface and normally that part of the blade tip surface from which the shroud 1 is formed. These elements or fins 2 can be specifically machined at any desired angled, shape or height in order to provide the best performance for cooling of the blade tip surface through air bled or leaking through the passages 5. Alternatively, entrainment elements could be separate components appropriately secured to the blade tip. Generally, a consideration of the rotational speed will be taken such that the elements or fins 2 will be substantially perpendicular to the coolant flow leakage swirl direction as the blade rotates and as indicated previously will have a height above the opening 14 of the passages 5. In order to further enhance the heat transfer within the channels between the entrainment elements 2 ripple or trip strips or other heat transfer co-efficient augmentation structures can be provided for heat exchange with the coolant flow.

By the present invention a surface cooling technique is provided to ensure adequate cooling of the blade tip. As indicated previously, surface cooling has the advantage of a lower weight addition along with reduced stress levels and manufacturing costs in comparison with specific provision of a large number of coolant passages and openings in the actual blade tip structure wall thickness. In such circumstances, the width 6 of the blade tip can be thinner as this thickness need not incorporate the passages and openings for coolant release whilst maintaining sufficient structural integrity to resist distortion or disintegration in use. In short, the entrainment elements or fins 2 allow increased cooling efficiency with surface released coolant flow by entrainment and retaining that coolant flow adjacent to the surface 12 for cooling performance.

The specific height, shape and angular orientation of the entrainment elements or fins 2 may be consistent throughout the blade tip surface or varied dependent upon specific cooling requirements or necessity to achieve higher localised strength or cooling in the blade tip.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A blade cooling arrangement comprising a blade tip including a coolant gallery and flow entrainment fins, the coolant gallery being in use upstream of said flow entrainment fins, the gallery including release passages to release coolant close to the blade tip surface, wherein said flow entrainment fins are so configured and arranged as to create flow channels along which said coolant is entrained and driven thereby to create a layer strata that is isolated from turbulent air created by a shroud or leading edge of the blade tip, wherein the release passages have a downward inclination towards the flow entrainment means and in use project the coolant flow in that downward inclination.

2. An arrangement as claimed in claim 1 wherein the gallery includes a cavity from which the release passages extend.

3. An arrangement as claimed in claim 1 wherein the release passages extend laterally towards the flow entrainment fins.

4. An arrangement as claimed in claim 1 wherein the flow entrainment fins are upstanding fins.

5. An arrangement as claimed in claim 4 wherein the fins extend above the height of the release passages.

6. An arrangement as claimed in claim 4 wherein the fins are substantially perpendicular to the blade tip surface.

7. An arrangement as claimed in claim 4 wherein each fin has substantially the same height.

8. An arrangement as claim in claim 4 wherein the fins provide additional contact surface area for enhanced heat transfer to the coolant air flow.

9. An arrangement as claimed in claim 1 wherein the coolant flow is driven in use by rotation of the blade tip.

* * * * *